Jan. 2, 1962  F. M. WALKER  3,015,221
PUMP IN ABSORPTION REFRIGERATION MACHINE
Filed March 31, 1958
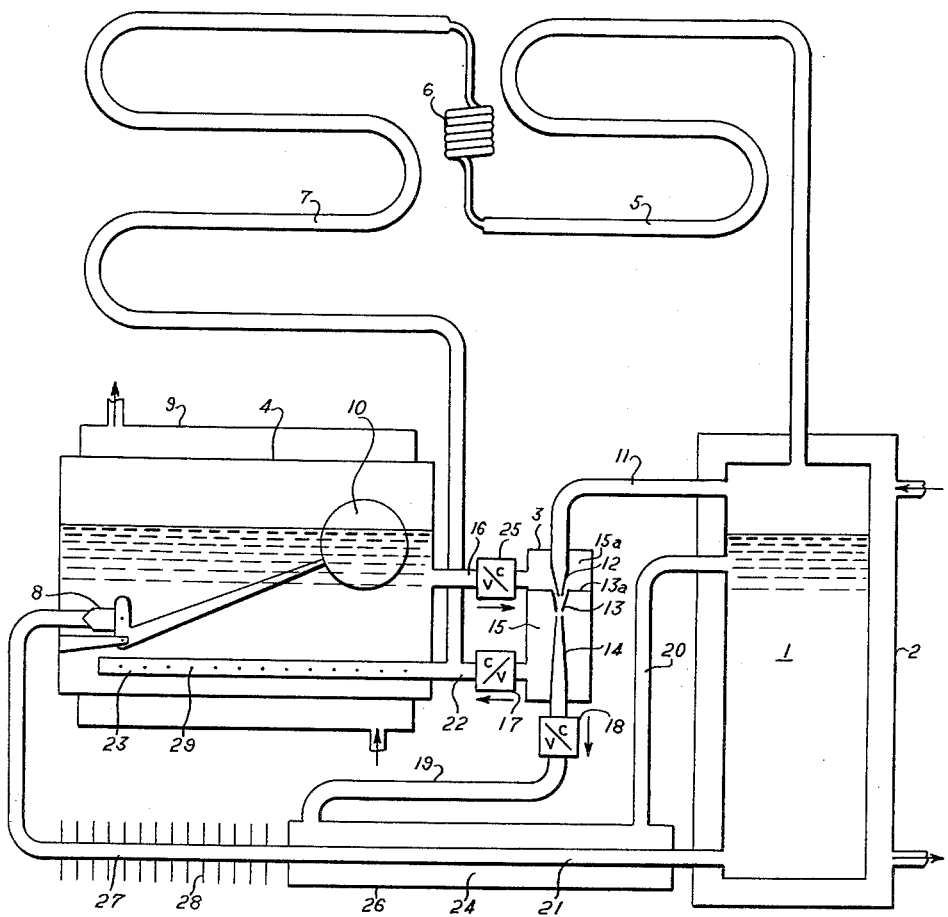
INVENTOR.
FRANK M. WALKER
BY
Dunlap, Laney & Hubbard
ATTORNEYS United States Patent Office 3,015,221
Patented Jan. 2, 1962

3,015,221
PUMP IN ABSORPTION REFRIGERATION
MACHINE
Frank M. Walker, 3825 NW. 28th St.,
Oklahoma City, Okla.
Filed Mar. 31, 1958, Ser. No. 725,421
4 Claims. (Cl. 62—487)

This invention relates to absorption refrigeration and more particularly to a new and novel method of pumping absorption solution from the absorber to the generator in a two pressure type of absorption refrigeration machine.

An object of this invention is to provide a hermetically sealed absorption refrigerating machine of the two pressure type that automatically circulates the working fluids therein due to forces generated within the machine.

A further object is to provide a hermetically sealed absorption refrigerating machine with no moving mechanical parts other than a few simple automatically operated valves for producing a continuous refrigerating effect by the application of heat energy only.

The invention together with its objects and advantages is set forth in more technical detail in the following description and accompanying drawing wherein:

The figure of the drawing is a diagrammatic illustration of this invention.

It is to be expressly understood, however, that the drawing is for the purpose of illustration only and not a definition of the limitation of the invention, reference being had for this purpose to the appended claims.

Referring to the drawing, a two pressure type absorption refrigeration system is illustrated comprising a generator 1, a conventional injector pump 3 having first and second chambers 15a and 15, respectively, formed by a partition 13a, and a combining tube 13, which forms a central communication between the first and second chambers, absorber 4, condenser 5, and evaporator 7 all interconnected for the circulation of refrigerant and absorbent. The system is evacuated of all air or other gases, then filled to the proper level with a solution of absorbent, such as water, and a refrigerant, such as ammonia. The generator 1 and absorber 4 are partially filled with liquid solution, leaving a vapor space in the upper part of each.

The operation is as follows: The generator 1 is heated by any suitable source, such as steam in jacket 2. The heat drives the ammonia vapor out of the solution in the generator 1. The liberated ammonia vapor flows out through conduit 11 and also into the condenser 5. The vapor flowing through conduit 11 is forced out of the jet 12 of the injector pump 3. This vapor combines with the solution in the combining tube 13 which, due to the velocity, sets the solution in motion toward pressure tube 14. Since the initial pressure of the liquid in the generator 1 is higher than the pressure of the liquid emerging from the end of the combining tube 13, the check valve 18 will remain closed and prevent liquid from flowing back out of the generator 1 through pressure tube 14. Therefore the liquid emerging from tube 13 passes out of the gap between tubes 13 and 14, through chamber 15, check valve 17, tube 22 and tube 23 into the bottom of absorber 4. The liquid flows up through the absorber 4 and back into the first chamber 15a and combining tube 13 by way of check valve 25 and tube 16 to complete a temporary cycle. The vapor is generated in the generator 1 faster than it can escape from jet 12, therefore a vapor pressure is developed in the generator 1 equal to the ammonia condensing pressure in the condenser 5.

As the pressure in generator 1 increases and reaches its maximum value, the velocity of the vapor emerging from the jet 12 also increases, thus increasing the velocity of the solution emerging from the combining tube 13. When the solution leaving the small end of the combining tube 13 reaches a sufficiently high velocity, it will be directed as a stream into the small adjacent end of the pressure tube 14, rather than into the chamber 15, such that the tubes 13 and 14 then function as the pump tube of the jet pump 3. In fact, movement of the stream from the tube 13 into the tube 14 will create a venturi action in the chamber 15 between the tubes. While flowing through the pressure tube 14, the high velocity stream of solution has at least a portion of its kinetic energy converted to pressure by virtue of the progressive increase in diameter of the tube 14 in the direction of flow. The increase in pressure of the stream of solution in the tube 14 is sufficient to overcome the pressure exerted from the generator 1 on the check valve 18, such that the stream of solution flows on through the check valve 18, conduit 19, outer chamber 24 of liquid heat exchanger 26, tube 20 and into the generator 1. Solution will be drawn from the absorber 4 into chamber 15a of injector pump 3 and forced into the generator 1 by the vapor jet in the pump 3. As soon as flow is established from tube 13 through pressure tube 14, there will be a suction created in chamber 15 due to the venturi action at the gap between tubes 13 and 14. Check valve 17 is provided to prevent liquid from being drawn from the bottom of the absorber 4 through tubes 23 and 22 and entrained into the high velocity jet crossing the gap between tubes 13 and 14. As soon as liquid begins flowing from the absorber 4 through pump 3 and into the generator 1, the float 10 is lowered which opens valve 8 and allows liquid to enter the absorber 4 from the generator 1.

As the liquid flows up through the absorber 4, it is cooled by the cooling water flowing through jacket 9. This causes the pressure in the absorber 4 to be reduced and draw ammonia vapor in through pipe 23 from evaporator 7. This vapor is absorbed by the weak solution therein. A capillary tube 6 regulates the flow of liquid ammonia from the condenser 5 into the evaporator 7. Although I have shown a capillary tube 6 to regulate the flow of ammonia, it is obvious that an expansion valve could be used with the same or better results. The liquid ammonia in the evaporator 7 vaporizes and produces refrigeration or the absorption of heat from the surroundings.

It will be observed that certain refinements such as the liquid heat exchanger 26, the heat radiating fins 28 on conduit 27, and the small diameter holes 29 in tube 23 are provided to improve the efficiency of the machine. It is also possible to eliminate the check valve 25 without rendering the machine inoperative, therefore this check valve 25 aids in starting the machine as well as improve the efficiency.

While I have shown a single embodiment of the invention as herein illustrated and described, it will be understood that modifications may be made in the construction and arrangement of elements without departing from the spirit or scope of the invention. Therefore, without limitation in this respect, the invention is defined by the following claims.

I claim:

1. In an absorption type refrigeration system, the combination of: a generator having a vapor section and a liquid section, an absorber containing a partially saturated solution, said absorber having a pressure lower than the generator and having an upper end and a lower end, means forming a pump chamber having a first end and a second end, a solution supply conduit communicating with the first end of said pump chamber and the solution in the absorber above the lower end of the absorber to supply solution to said pump chamber, a check valve in said supply conduit preventing flow from said pump chamber therethrough, a jet mounted axially in the first end of said pump chamber and directed toward the second end of said pump chamber, a vapor conduit providing communication between the vapor section of the generator and said jet for jetting vapor from the generator into the first end of said pump chamber toward the second end of said pump chamber at a velocity in accordance with the pressure in the generator, a solution feeding conduit communicating with the second end of said pump chamber and the liquid section of the generator, a check valve in said solution feeding conduit preventing flow from the generator, tapered tube means supported in said pump chamber from around said jet to the second end of said pump chamber in communication with said solution feeding conduit to draw solution from the absorber and pump said solution through said solution feeding conduit into the generator at a predetermined pressure of the generator, and bypass means communicating with said pump chamber in spaced relation from the first end of said pump chamber and with the lower end of the absorber to bypass vapor issuing from said jet at pressures below said predetermined pressure.

2. A refrigeration system as defined in claim 1 wherein said tapered tube means comprises a combining tube supported around said jet and converging toward the second end of said pump chamber, and a pressure tube supported in axial alignment with the combining tube and having its diameter progressively increased toward the second end of said pump chamber, the adjacent ends of said combining and pressure tubes being of substantially equal diameters and positioned in closely spaced relation for passage of a stream of solution therethrough when said predetermined pressure is reached in the generator.

3. In an absorption type refrigeration system, the combination of: a generator having a vapor section and a liquid section; an absorber containing a partially saturated solution, said absorber having a pressure lower than the generator; pump means having a first chamber and a second chamber with a central communication therebetween, a jet mounted in the first chamber and directed toward said central communication and said second chamber, tapered tube receiving means mounted in said second chamber and axially aligned with said jet means to receive a jet of vapor issued therefrom and passing through said central communication; vapor supply conduit means communicating between the vapor section of the generator and said jet to provide vapor at generator pressure to said jet, conduit means communicating between said tapered tube receiving means and said generator for passing fluid received in said tapered tube to said generator, said last mentioned conduit means having a check valve therein for preventing passage of fluid from said generator to said tapered tube, solution supply conduit means communicating between said first chamber and said absorber to supply solution to said pump means, said solution supply conduit means having a check valve therein for preventing flow of fluid from said first chamber to said absorber, and bypass conduit means communicating between said second chamber and said absorber to pass fluid from said second chamber to said absorber, said bypass conduit means having a check valve therein to prevent flow of fluid from said absorber to said second chamber, whereby said bypass means will establish initial flow through said jet until the velocity of the vapor issued from the jet as a result of generator pressure is sufficient to overcome the pressure in said tapered receiving tube and establish return flow to said generator.

4. In an absorption type refrigeration system, the combination as set out in claim 3 wherein said central communication between said first and second chambers is defined by a tapered combining tube axially aligned with said tapered tube receiving means and extending to a point adjacent said tapered tube receiving means, said combining tube having a minimum internal diameter substantially equal the minimum internal diameter of said tapered tube receiving means.

References Cited in the file of this patent
UNITED STATES PATENTS

| | | |
|---|---|---|
| 1,866,825 | Smith | July 12, 1932 |
| 1,882,252 | Randel | Oct. 11, 1932 |
| 1,934,690 | Babcock | Nov. 14, 1933 |
| 2,104,847 | Brace et al. | Jan. 11, 1938 |
| 2,146,077 | Kuenzli | Feb. 7, 1939 |
| 2,146,078 | Ullstrand | Feb. 7, 1939 |
| 2,776,548 | Martiri | Jan. 8, 1957 |